UNITED STATES PATENT OFFICE.

CHARLES MAULL, OF ST. LOUIS, MISSOURI.

PROCESS OF MAKING POTATO-MEAL.

SPECIFICATION forming part of Letters Patent No. 345,159, dated July 6, 1886.

Application filed July 22, 1884. Serial No. 138,479. (No specimens.)

*To all whom it may concern:*

Be it known that I, CHARLES MAULL, a citizen of the United States, residing at the city of St. Louis, in the State of Missouri, have invented a new and useful Process of Making Potato-Meal, of which the following is a specification.

My invention consists in the manufacture of meal from potatoes in the following manner, viz: Peel the potatoes, then slice or grate them, and drop into clear water, when a sediment like flour will gather in the bottom of the vessel containing the water. This sediment is cleaned by repeated washing in water, and is then dried. The pieces or grated potatoes are then bleached with sulphur or other chemical, then dried by heat, and then ground into meal. Said meal and the flour hereinbefore referred to are then mixed together.

What I claim, and desire to secure by Letters Patent of the United States, is—

The hereinbefore-described process for preserving potatoes, consisting in first peeling the potatoes, slicing or grating them, and placing the slices or pieces in clear water and cleaning and drying the sediment formed thereby; second, chemically bleaching the slices or pieces of grated potatoes, then drying them and grinding them into meal; third, mixing the dried sediment obtained by the first step and the meal obtained by the second step, substantially as set forth.

CHARLES MAULL.

Witnesses:
JULIUS ROBERTSON,
F. A. WIND.